United States Patent [19]

Mizuno et al.

[11] Patent Number: 4,489,496
[45] Date of Patent: Dec. 25, 1984

[54] DIAL GAUGE

[75] Inventors: Ichiro Mizuno; Iwao Sugizaki, both of Kawasaki, Japan

[73] Assignee: Mitutoyo Mfg. Co., Ltd., Tokyo, Japan

[21] Appl. No.: 463,108

[22] Filed: Feb. 2, 1983

[30] Foreign Application Priority Data

Feb. 8, 1982 [JP] Japan .................. 57-18589

[51] Int. Cl.³ .............................................. G01B 3/22
[52] U.S. Cl. .............................. 33/172 R; 33/172 E
[58] Field of Search ............ 33/172 R, 172 E, 149 R, 33/147 R, 147 N

[56] References Cited

U.S. PATENT DOCUMENTS

| 1,151,635 | 8/1915 | Webb ................................. 33/172 R |
| 2,190,961 | 2/1940 | Webber ............................. 33/172 R |
| 2,834,115 | 5/1958 | Bachmann ........................ 33/172 R |
| 2,921,375 | 1/1960 | Kustusch .......................... 33/172 R |
| 3,924,337 | 12/1975 | Taylor ............................... 33/172 E |

FOREIGN PATENT DOCUMENTS

| 1075325 | 2/1960 | Fed. Rep. of Germany .... 33/172 E |
| 1079335 | 4/1960 | Fed. Rep. of Germany .... 33/172 E |

Primary Examiner—Willis Little
Attorney, Agent, or Firm—Flynn, Thiel, Boutell & Tanis

[57] ABSTRACT

A dial gauge wherein a cam (14) engaged with a spindle (16) and rotatable in accordance with an axial displacement value of the spindle (16) is provided and an indicating mechanism (13, 113) is driven by a rotation of the cam (14) to indicate a measured value. This dial gauge is simplified in construction and easy in assembling without requiring to use high precision-finish parts such as a rack portion, pinion and the like.

13 Claims, 3 Drawing Figures

DIAL GAUGE

BACKGROUND OF THE INVENTION

1. Field of the Invention

This invention relates to dial gauges, and more particularly to improvements in construction in which a displacement of a measuring element at the forward end of a spindle is imparted to an indicating mechanism.

2. Description of the Prior Art

There has heretofore been used a dial gauge as an measuring instrument in which a fine movement of a measuring element is enlarged by a gearing, workpiece to be measured is compared with a block gauge or a reference length for the measurement, whereby a difference in dimension therebetween is read so as to obtain a deviation.

The conventional dial gauge has been constructed such that a spindle radially penetrating through a case body is provided at the substantially central position of the bottomed cylindrical case body, a displacement of the spindle in the radial direction of the case body is imparted to a pinion through a rack portion formed on the spindle, and further, rotation of this pinion is enlarged by an enlarging mechanism and imparted to a needle.

However, the conventional dial guage as described above has been disadvantageous in that the large number of component parts as a whole leads to difficulty in assembling, the adjustment during assembling is not easily carried out and deviations tend to occur between the parts. Moreover, necessity of providing high precision finish to the rack portion, pinion and the like of the spindle leads to high costs of the parts themselves, and necessity for using a plurality of such expensive parts results in difficulty in manufacturing the dial gauge at a low cost.

SUMMARY OF THE INVENTION

The present invention has as its object the provision of a dial gauge being simple in construction, easily assembled and capable of being manufactured at a low cost.

To achieve the above-described object, the present invention comtemplates that a movement of a spindle axially displaceably provided on a case body is imparted to a cam engaged with the spindle and rotatable by the axial displacement of the spindle, rotation of the cam is adapted to drive an indicating mechanism so as to indicate an axial displacement value of the spindle, and necessity of the parts of high precision finish such as the rack portion, pinion and the like is eliminated to thereby simplify the construction.

DETAILED DESCRIPTION OF THE PREFERRED EMBODIMENTS

Description will hereundef be given of embodiments of the present invention with reference to the drawings.

Figure 2:
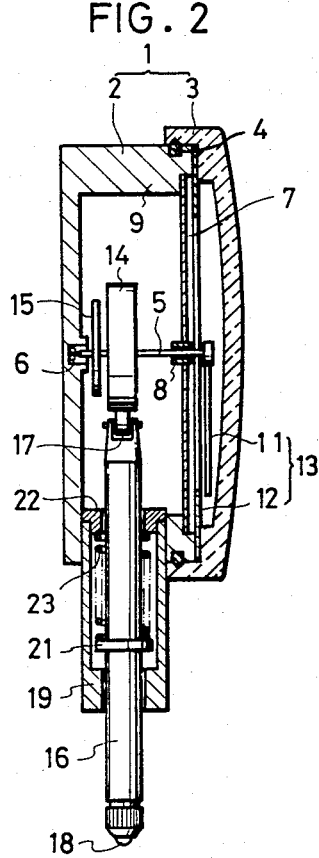
FIG. 2 is a sectional view taken along the line II—II in FIG. 1.
Figure 1:
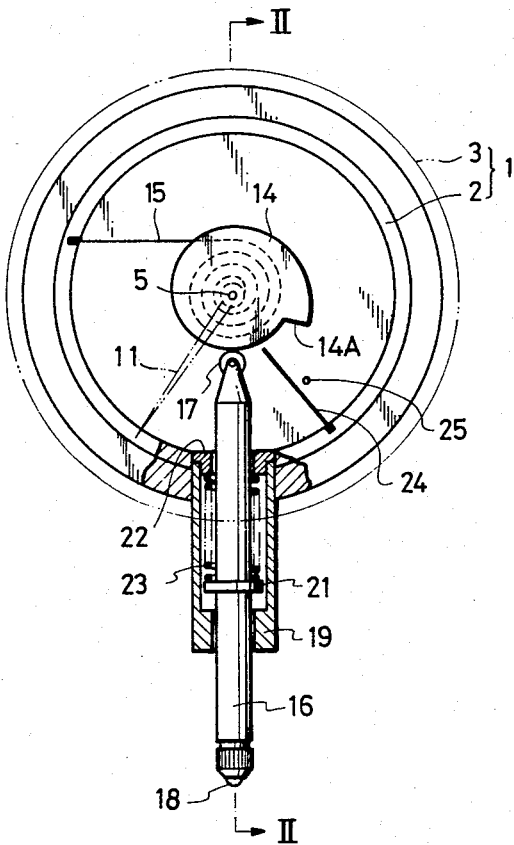
FIG. 1 is a front view, partially broken away, showing an embodiment of the dial gauge according to the present invention, with the cover being removed.

In FIGS. 1 and 2, a case body 1 is constituted by a short, bottomed cylindrical container 2 and a transparent cover 3, and the container 2 and the cover 3 are relatively rotatably coupled to each other through an O-ring 4.

A rotary shaft 5 is provided in the central portion in the container 2, the rotary shaft 5 is rotatably supported at the proximal end thereof by a pivot bearing 6 and at the distal end thereof by a bearing portion 8 of a base plate 7, respectively, and the base plate 7 is affixed to an inner peripheral ledge 9 formed adjacent to the top end edge of the container 2.

A needle 11 is secured to the forward end portion of the rotary shaft 5, while, a hollow, disc-like dial plate 12 is adhesively applied to the inner side of the cover 3 in the inner circumferential direction thereof. The needle 11 and the dial plate 12 constitute an indicating mechanism 13. Additionally, the needle 11 completes a full scale by one rotation thereof, while, the dial plate 12 has the minimum scale of 1/100 mm.

Solidly secured to the substantially central portion of the rotary shaft 5 is a cam 14 having an outer peripheral surface as being a cam surface formed into an Archimedean spiral in such a manner that, if the outer peripheral surface is rotated substantially through 360°, then the outer diameter is increased by 1 mm, and a winding end of a hair spring 15 as being a biasing means is affixed to the cam 14 of the rotary shaft 5 at the side of the bottom face of the container 2. The other end of the hair spring 15 is pressed and affixed into the peripheral wall of the container 2, and the cam 14 is biased so as to be rotated in the counterclockwise direction in FIG. 1.

A roller 17 rotatably mounted on one end of a spindle 16 can abut against the cam surface of the cam 14. Mounted on the other end of the spindle 16 is a measuring element 18 and this spindle 16 is guided and supported by a stem 19 projected from the container 2 in a manner to be displaceable in the radial direction of the container 2, i.e., in the axial direction of the spindle 16, with a stroke of 1 mm thereof being secured. A spring bearing 21 is affixed to a position in the stem 19 of the spindle 16, and a compression coil spring 23 as a spindle biasing means for biasing the spindle 16 in the projecting direction is confined between this spring bearing 21 and a plug member 22 threadably coupled into an inner end of the stem 19. Further, a key-shaped ridge, not shown, is provided at a portion of the spring bearing 21, and this ridge is engaged with a keyway, not shown, formed on the inner peripheral surface of the stem 19, to thereby lock the rotation of the spindle 16.

A sheet spring-like return spring 24 is provided adjacent to the spindle 16 in the container 2. The proximal end of this return spring 24 is affixed to the peripheral wall of the container 2, while, the distal end thereof can abut against an erected portion 14A of the cam 14 in the rotating direction of the cam 14, and, this return spring 24, when abutting, biases the cam 14 in the counterclockwise direction in FIG. 1. Additionally, a stopper 25 is projected from the bottom face of the container 2 at a portion adjacent to one side of the return spring 24.

Description will now be given of action of the present embodiment.

The spindle 16 is biased by the spring 23 downwardly in FIGS. 1 and 2, while, the cam 14 is biased by the hair spring 15 in the counterclockwise direction in FIG. 1. The cam surface of the cam 14 is constantly abutting against the roller 17 irrespective of the position of the spindle 16 in its axial direction. When the measuring element 18 at the forward end of the spindle 16 is abutted against a workpiece and the spindle 16 is urged upwardly in the drawing against the resiliency of the compression coil spring 23, the roller 17 of the spindle 16 causes the cam 14 to rotate. In this case, abutting against the cam surface of the cam 14 is the rotatable roller 17, whereby rotation of the cam 14 is performed very smoothly. Furthermore, a rotation value of the cam 14 is in proportion to an axial displacement value of the spindle 16 because the cam surface assumes the Archimedean spiral.

When the cam 14 is rotated as described above, the rotary shaft 5 and the needle 11 affixed to this rotary shaft 5 are rotated, so that a movement value of the measuring element 18 can be read on the dial plate 12 as a deflection of the needle 11.

When the spindle 16 is urged upwardly to the upper limit, the forward end portion of the return spring 24 is abutted against the erected portion 14A of the cam 14. In consequence, when the spindle 16 is to descend from the upper limit, the cam 14 is biased in the counterclockwise direction in the drawing not only by a biasing force of the hair spring 15 but also by a biasing force of the return spring 24. In other words, a so-called dashing force is applied to an inversional motion from the rotation in the clockwise direction to the rotation in the counterclockwise direction of the cam 14, so that the inversional motion can be carried out very smoothly. In this case, an angle of deflection at the forward end portion of the return spring 24 is limited to a predetermined value or less by a stopper 25 disposed adjacent to the return spring 24, whereby a biasing force more than necessary will not be given to the cam 14 rotating in the counterclockwise direction.

The above-described embodiment can offer the following advantages.

Construction as a whole is simplified, the parts are reduced in number, and particularly, expensive parts such as a pinion and the like are not used, so that the dial gauge can be provided at a low cost. Furthermore, there is no possibility of causing deviations including shifts, etc. to the portions of engagement in the pinion and the like, and dispersions in measured value due to the backlash are avoided, thus enabling to eliminate the necessity for the backlash preventive mechanism.

Further, in accordance with the above-described embodiment, the assembling work is improved in efficiency, which leads to the provision of the dial gauge at a low cost, differing from the conventional dial gauge, for which high skill level has been required in assembling.

Since a rotation value of the cam 14 abutted against the spindle 16 through the roller 17 is directly indicated by the indicating mechanism 13, no deleterious change in measurement with time occur and respective parts including the needle may move smoothly, differing from the conventional dial gauge wherein a displacement of the spindle is imparted to the needle through respective engaged portions including pinions and the like.

Furthermore, necessity of providing a damper mechanism for the spindle is eliminated.

Additionally, in the above-described embodiment, the spindle 16 is provided with the stroke of 1 mm. However, in the various comparative measurements in the field of precision finish nowadays, necessity of a particularly long stroke is eliminated in many cases, and a stroke of about 1 mm or less may be sufficiently widely used.

Further, the dial gauge according to the present invention is dissimilar to the conventional dial gauge wherein a spindle traversing the central position of the case body is housed in the case body, and pinions and the like are additionally assembled into the case body at positions contiguous to the spindle. In this respect, the dial gauge according to the present invention is advantageous in that the assembling work is facilitated, the dial gauge is rendered compact in size and formed into various configurations suitable for use.

In the above-described embodiment, the outer peripheral surface of the cam 14 is formed into a cam surface, against which the roller 17 of the spindle 16 is abutted. This arrangement may be replaced by one in which a cam groove being of a predetermined shape is formed at one side surface of the cam, and a portion of or a pin, etc. projected from the spindle is slidably coupled into this cam groove, whereby the spindle and the cam are engaged with each other. In this case, necessity of providing a biasing means for engaging the spindle 16 with the cam 14 as seen with the aforesaid hair spring 15 may be eliminated.

Additionally, the roller 17 need not necessarily be provided. When a pressure angle between the cam 14 and the spindle 16 is great to a certain extent, an axial displacement of the spindle 16 may be imparted to the cam 14 to be smoothly converted into a rotary motion of the cam 14 even if the roller 17 is not provided. However, if the roller 17 is provided, then the advantage can be offered that the motion of the spindle 16 is smoothly imparted to the cam 14 even if the pressure angle between the cam 14 and the spindle 16 is small.

Figure 3:
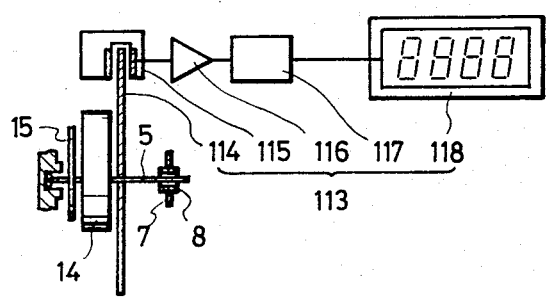
FIG. 3 is a sectional view showing the arrangement of the indicating mechanism in an embodiment other than the above-mentioned one.

Furthermore, the indicating mechanism 13 is constituted by the needle 11 and the dial plate 12. However, this arrangement may be replaced by one like an indicating mechanism 113 shown in FIG. 3, wherein a rotation value of the rotary shaft 5 is detected by a rotary encoder of a photoelectric type, a magnetic type or the like and indicated. More specifically, this indicating mechanisn 113 comprises: a rotary disc 114 affixed to the rotary shaft 5; a detector 115 provided on the outer peripheral portion of this rotary disc 114; an amplifier 116 for amplifying a detection signal detected by the detector 115; a detection signal processing portion 117 for processing the detection signal thus amplified by the amplifier 116; and an indicating board 118 connected to the detection signal processing portion 117, for digitally indicating a measured value. When the rotary encoder comprising the rotary disc 114 and the detector 115 is used and so forth as described above, if the arrangement in which the cam and the spindle are engaged through the cam groove formed at one side of the cam is adopted, then the cam groove can be formed into a spiral shape voluted several times, so that the cam, turning several times, is engageable with the spindle in accordance with a displacement of the spindle, thereby enabling to easily enlarge the stroke of the spindle.

The cam surface of the cam 14 is formed into the Archimedean spiral, but, may be replaced by one not using the Archimedean spiral as far as the indicating mechanism 13 or 113 is accommodated to properly indicate. However, the adoption of the Archimedean spiral makes it possible to form the dial plate 12 to have a uniform scale because a displacement value of the spindle 16 and a rotation value of the cam 14 are in proportion to each other, thus resulting in simplified construction of the indicating mechanism 113.

Further, adoption of varied sizes of the cam 14 makes it possible to obtain varied lengths of stroke of the spindle 16, so that varied types of the minimum scales can be used.

As has been described hereinabove, the present invention can provide a dial gauge being simplified in construction, easy in assembling and capable of being produced at a low cost.

What is claimed is:

1. A dial gauge comprising: a case body; a spindle provided at the forward end thereof with a measuring element and axially displaceable secured to said case body; a rotatable cam having a circumferentially varying radius surface engaged by a portion of said spindle, the displacement direction of said spindle portion being approximately toward and away from the rotation axis of said cam; low friction means interposed between said cam and spindle portion for rotation of the cam by an axial displacement of said spindle in said case body not past the rotation axis of said cam; and an indicating mechanism for indicating an axial displacement value of said spindle by a rotation of said cam.

2. A dial gauge comprising: a case body; a spindle provided at the forward end thereof with a measuring element and axially displaceably secured to said case body; a cam engaged with said spindle and rotatable by an axial displacement of said spindle in said case body; an indicating mechanism for indicating an axial displacement value of said spindle by a rotation of said cam; and a roller secured to one end of said spindle, said spindle being abutted against and engaged with said cam through said roller.

3. A dial gauge as set forth in claim 2, wherein a portion of said cam engaged with said spindle is formed into an Archimedean spiral.

4. A dial gauge as set forth in claim 3, wherein said indicating mechanism comprises a dial plate and a needle secured to a rotary shaft of said cam.

5. A dial gauge as set forth in claim 3, wherein said indicating mechanism comprises: a rotary disc secured to the rotary shaft of said cam; a detector provided on the outer peripheral portion of said rotary disc; and an indicating board for digitally indicating a measured value in response to a detection signal detected by said detector.

6. A dial gauge comprising: a case body; a spindle provided at one end thereof in said case body with a roller and at the forward end thereof outside said case body with a measuring element, said spindle being axially displaceably secured to said case body; a cam engaged at the peripheral surface thereof with said roller and rotatable by an axial displacement of said spindle; and an indicating mechanism for indicating an axial displacement of said spindle by a rotation of said cam.

7. A dial gauge as set forth in claim 6, wherein said cam is provided with a return spring being abutted against said cam in a rotating direction of said cam, for biasing said cam in a reverse direction as said cam is reversed.

8. A dial gauge as set forth in claim 7, wherein the peripheral surface of said cam is formed into an Archimedean spiral.

9. A dial gauge as set forth in claim 8, wherein said indicating mechanism comprises a dial plate and a needle secured to a rotary shaft of said cam.

10. A dial gauge as set forth in claim 8, wherein said indicating mechanism comprises: a rotary disc secured to the rotary shaft of said cam; a detector provided on the outer peripheral portion of said rotary disc; and an indicating board for digitally indicating a measured value in response to a detection signal detected by said detector.

11. A dial gauge comprising: a case body including a container and a cover which are relatively rotatably coupled to each other; a spindle axially displaceably secured to said container, and provided at one end thereof in said container with a roller and at the other end thereof outside said case body with a measuring element; a cam rotatably supported in said container, engaged at the peripheral surface thereof with said roller and rotatable by an axial displacement of said spindle; and an indicating mechanism for indicating an axial displacement value of said spindle by a rotation of said cam.

12. A dial gauge as set forth in claim 11, wherein said indicating mechanism comprises a needle secured to a rotary shaft of said cam and a dial plate affixed to said cover.

13. A dial gauge as set forth in claim 11, wherein said indicating mechanism comprises a rotary disc secured to the rotary shaft of said cam, a detector provided on the outer peripheral portion of said rotary disc and an indicating board for digitally indicating a measured value in response to a detection signal detected by said detector.

* * * * *

UNITED STATES PATENT AND TRADEMARK OFFICE
CERTIFICATE OF CORRECTION

PATENT NO. : 4 489 496

DATED : December 25, 1984

INVENTOR(S) : Ichiro Mizuno and Iwao Sugizaki

It is certified that error appears in the above-identified patent and that said Letters Patent is hereby corrected as shown below:

Column 5, line 19; change "displaceable" to ---displaceably---.

Signed and Sealed this

Ninth Day of July 1985

[SEAL]

Attest:

DONALD J. QUIGG

Attesting Officer     Acting Commissioner of Patents and Trademarks